Feb. 23, 1926.
F. A. GIBSON
NUT LOCK
Filed May 23, 1923
1,574,619
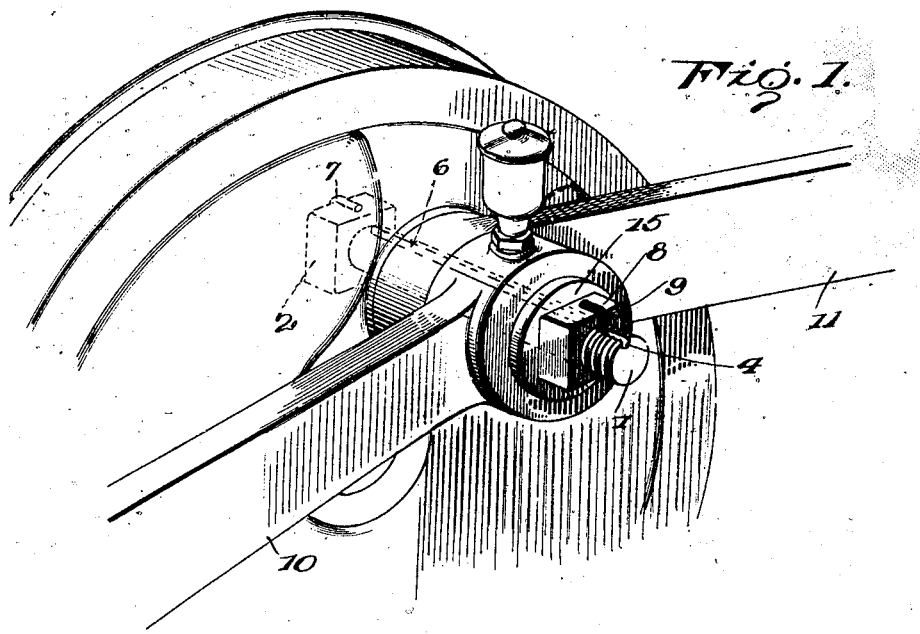
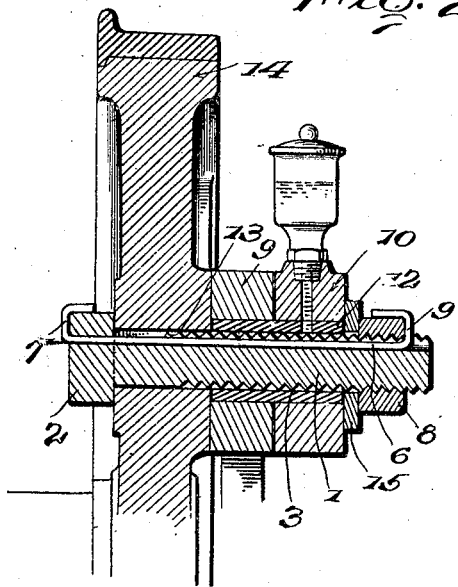
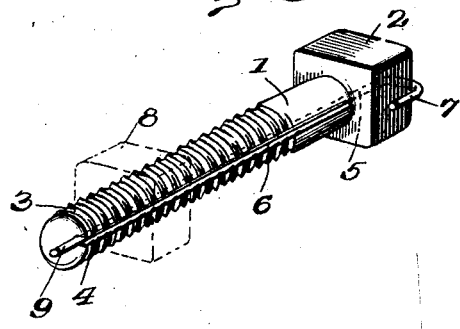
WITNESSES
INVENTOR
F. A. Gibson.
BY
ATTORNEYS Patented Feb. 23, 1926.

1,574,619

UNITED STATES PATENT OFFICE.

FELIX A. GIBSON, OF MARTIN COUNTY, FLORIDA.

NUT LOCK.

Application filed May 23, 1923. Serial No. 640,943.

*To all whom it may concern:*

Be it known that I, FELIX A. GIBSON, a citizen of the United States, and resident of Martin County and State of Florida, have invented certain new and useful Improvements in Nut Locks, of which the following is a specification.

This invention relates to nut locks and it consists in the combinations, constructions and arrangements herein described and claimed.

An object of the invention is to provide a nut lock of simplified construction which affords facilities for releasably and securely holding a nut against retrograde movement on a bolt from adjusted position on the latter without in any way hindering continued movement of a nut on the bolt toward the head of the latter.

A further object of the invention is to provide a nut lock of the character described which is economical to manufacture, effective for the purpose intended and thoroughly practical commercially.

Other objects and advantages will be apparent from the following description, considered in conjunction with the accompanying drawings, in which—

Figure 1 is a perspective view showing a nut lock embodying the invention operatively applied, Figure 2 is a vertical section through the structure exhibited in Figure 1, the section being taken along the longitudinal median line of the nut lock, and Figure 3 is a perspective view of the nut lock embodying the invention and shown in the preceding views.

In carrying out my invention, I make use of a bolt comprising a shank 1 merged at one of its ends into a head 2 and being threaded for part or all of its length as indicated at 3 and as is usual. The head 2 may have any desirable configuration and shape.

A groove 4 is formed in the shank 1 to extend longitudinally thereof for the entire length of the shank and to continue through the head of the bolt in the form of an aperture or opening 5 which is in alignment with the groove 4.

A locking element 6 in the form of a length of wire or a rod made of any suitable material which is adapted to be bent without breaking and to retain the form into which bent is adapted to be projected through the opening 5 and along the groove 4 until the major portion of the locking element has been extended through the opening 5 along the groove 4 and an end portion 7 of the locking element protrudes from the opening 5 beyond the head 2. The depth of the groove 4 and the gage or transverse area of the locking element 6 are such that the outer side of the locking element 6 is positioned below the synclinal portions of the threads 3 when resting against the bottom of the groove 4. In consequence, the locking element 6 positioned in the groove 4 in no way impedes the progress of a nut 8 which is adapted to threadedly engage the shank 1 and the nut 8 therefore may be screwed on the shank 1 toward the head 2 in an ordinary manner.

The end portion 7 of the locking element which as stated extends beyond the plane of the upper face of the head 2 is bent laterally against the upper face of the head and the extreme end portion is then bent downwardly against one of the side faces of the head as clearly shown in the drawing. The locking element 6 is preferably of a length to extend beyond the end of the shank 1 remote from the head although not necessarily so. The nut 8 is screwed on the shank 1 to a desired position and the end portion of the locking element extending in the portion of the groove 4 located between the nut 8 and the free end of the shank is bent laterally against the proximate face of the nut as indicated at 9 in Figures 1 and 2 and the extreme end portion of the portion 9 may be bent against one of the side faces of the nut 8, as shown.

To illustrate one application of the device, I show in Figures 1 and 2 oppositely extending members 10 and 11 respectively having hub portions mounted upon a sleeve 12 through which the shank 1 of my improved nut lock extends. The shank 1 is shown as extending through an opening 13 in the web of a wheel 14 so that the head 2 of the nut lock abuts one face of the web of the wheel and the sleeve 12 is held against the other face of the web of the wheel by the nut 8 and a washer 15 acting in conjunction with the bolt, the washer 15 being interposed on the shank between the nut 8 and the proximate end of the sleeve 12 and the proximate face of one of the members 10 and the nut 8 being threaded on the shank to exert pressure through the washer 15 against the parts just described as being contiguous to the latter. The nut 8 is held against retrograde movement by the engagement of the end portion 9 of the locking element 6 therewith and the locking element 6 is held against displacement from the groove 4 and opening 5 by the engagement of the end portions 7 and 9 with the head 2 and the nut 8, respectively. It is to be observed at this point that the nut 8 may be turned freely so far as the locking element is concerned on the shank 1 to advance said nut toward the head 2, the end portion 9 of the locking element protruding beyond the nut being bent against the latter after each adjustment of the nut on the shank.

It has been found in actual practice that the locking element 6 will hold the nut 8 against displacement from the shank even though the threads of the nut or bolt or both have been worn to such an extent that the nuts otherwise would be permitted to slide longitudinally of the shank of the bolt.

To remove the nut from the bolt, it is necessary to bend the end portion 9 from holding position into alignment with the body of the locking element and into position to extend along the groove 4.

Obviously, the application of a nut lock embodying the invention is not restricted to that illustrated in Figures 1 and 2 and also many modifications and adaptations of the form of nut lock shown in the drawings may be provided without departing from the spirit and scope of the invention. I therefore consider as my own all such modifications and adaptations of the form of nut lock shown which fairly fall within the spirit and scope of the appended claim.

I claim:—

A nut lock comprising a bolt having a screw threaded shank portion provided with a head, said bolt having a groove extending longitudinally thereof and being merged at one of its ends into an opening extending through said head, and a rod-like locking element made of a flexible material, said locking element being partially disposed in said groove and extending through said opening to project beyond the upper face of said head, the projecting end portion of the locking element being bent laterally into engagement with the face of the head and then longitudinally and against a side face of the head and the end portion of the locking element remote from the head being adapted to be bent laterally into engagement with a nut on the shank of the bolt, said second named end portion of the locking element being of sufficient length to extend laterally beyond a side face of the nut and to then have the terminal portion thereof bent inwardly against said face of the nut.

FELIX A. GIBSON.